Figure 1:
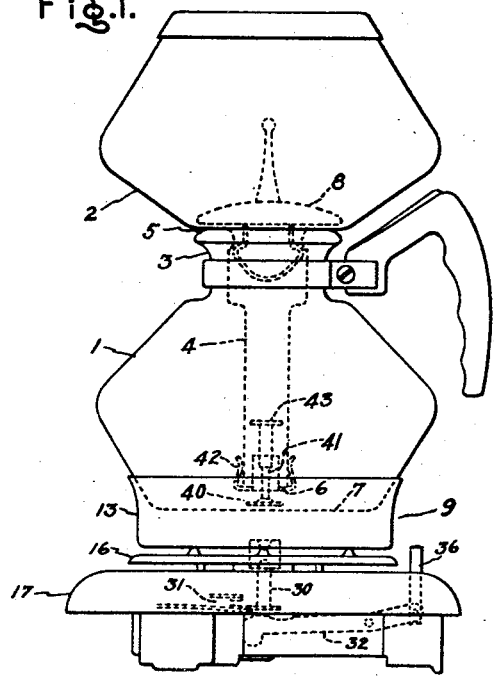

July 20, 1948.  E. C. SULLIVAN  2,445,591
COFFEE MAKER
Filed March 9, 1946  2 Sheets-Sheet 1

Inventor:
Earle C. Sullivan,
by Alfred V. Roberts
His Attorney.

July 20, 1948.                    E. C. SULLIVAN                    2,445,591
                                    COFFEE MAKER
Filed March 9, 1946                                              2 Sheets-Sheet 2
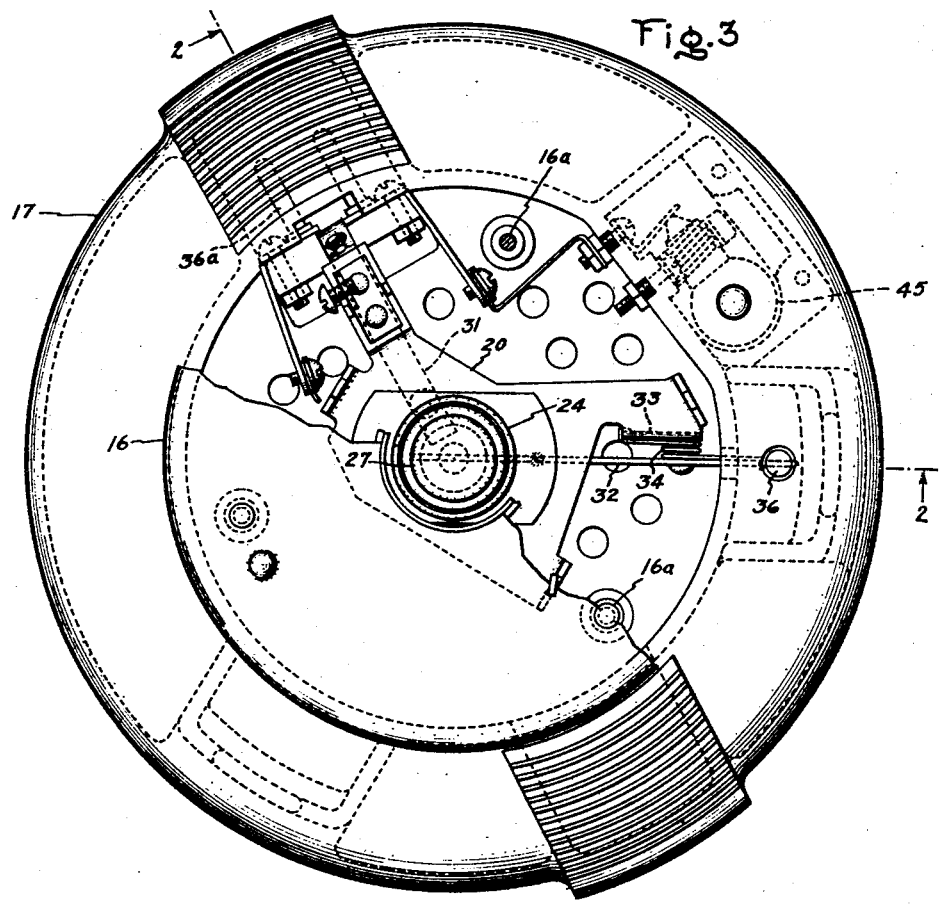
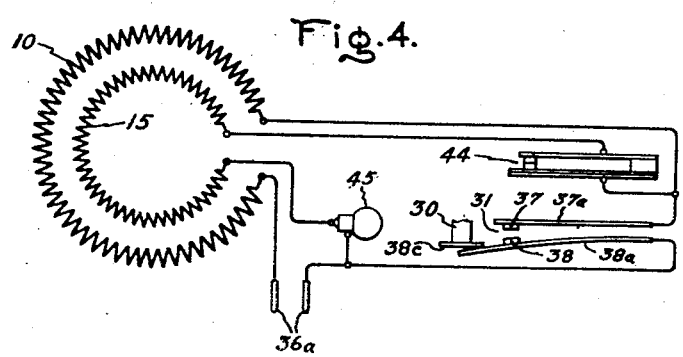
Inventor:
Earle C. Sullivan,
by Alfred V. Bobst
His Attorney.

Patented July 20, 1948

2,445,591

UNITED STATES PATENT OFFICE 2,445,591

COFFEE MAKER

Earle C. Sullivan, Bridgeport, Conn., assignor to General Electric Company, a corporation of New York Application March 9, 1946, Serial No. 653,365

2 Claims. (Cl. 99—281)

This invention relates to coffee makers, more particularly to coffee makers of the vacuum-type wherein heated water is transferred from a water heating receptacle to a coffee infusion receptacle where the brew is made, and thereafter the brew is returned to the water heating receptacle when the heat applied thereto has been reduced sufficiently, and it has for its object the provision of an improved device of this character.

More particularly, this invention contemplates improvements in the automatic vacuum-type coffee maker described and claimed in the United States patent to Walter R. Weeks, No. 2,287,583, dated June 23, 1942. The specific embodiment of that invention illustrated in the drawings of the Weeks patent comprises a magnet which controls the heater to reduce the application of heat to the water heating receptacle to permit the return of the brew responsively to the movement of the magnet from one controlling position wherein it causes the application of heat to the water heating receptacle to a second controlling position wherein it reduces the heat applied. The magnet is retained in the first position to cause heat to be applied by an armature. The armature is moved away from the magnet by a control element mounted in the liquid transfer tube so as to be moved upwardly therein responsively to the action of the water flowing from the water heating to the coffee infusion receptacle. When the armature is thus moved away the magnet is released and permitted to move to the second position to effect the reduction of heat applied.

This invention contemplates the provision of means for moving the magnet to the second position with a positive predetermined force thereby to insure a more positive action of the control for the coffee maker heater. In accordance with this invention, a second magnet is provided; and co-acting with it is a fixed armature, the parts being positioned so that when the first magnet is released and moves to its second heat reducing position the second magnet and armature coact to move it there with a positive force.

Figure 2:
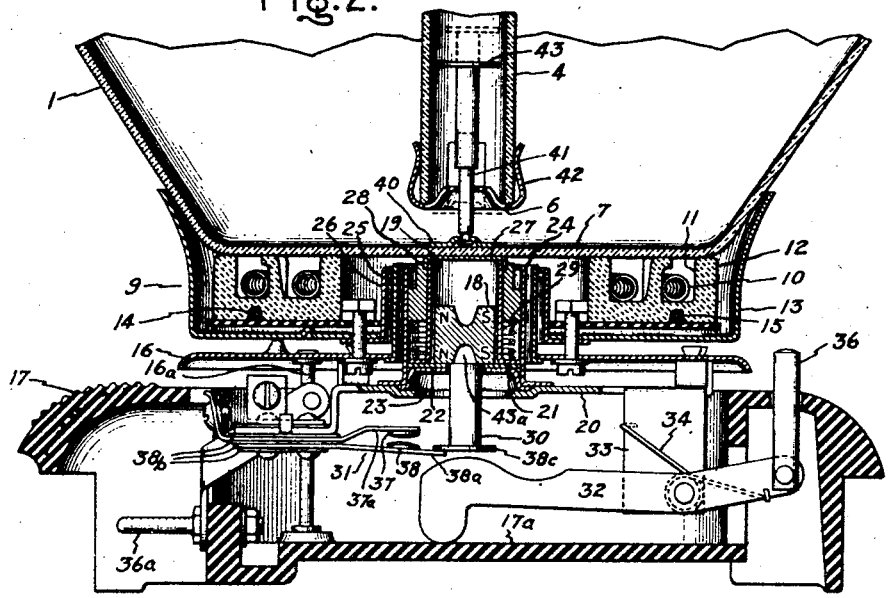

For a more complete understanding of this invention, reference should be had to the accompanying drawings in which Fig. 1 is a vertical elevation of a vacuum-type coffee maker embodying this invention; Fig. 2 is a fragmentary sectional view taken through the line 2—2 of Fig. 3 and drawn to a larger scale than Fig. 1; Fig. 3 is a plan view of certain elements shown in Fig. 2, parts being broken away so as to illustrate certain structural details; and Fig. 4 is a diagrammatic representation showing the heating means for the coffee maker stove and certain control elements therefor.

Referring to the drawings, this invention has been shown in one form as applied to a coffee maker of the vacuum-type comprising a lower water heating bowl or receptacle 1 and an upper coffee infusion bowl or receptacle 2. The lower bowl 1 is provided at its upper end with an upright neck 3 within which a depending liquid transfer tube 4 provided on the lower end of the upper bowl 2 is received. A suitable sealing gasket 5, preferably formed of rubber, is inserted in the neck 3 on the lower bowl and is provided with a centrally arranged aperture to receive the tube 4 provided on the upper bowl 2. As shown, the lower end 6 of the tube 4 terminates just above the bottom wall 7 of the lower bowl 1. Seated within the bottom of the coffee infusion vessel 2 over the mouth of the liquid transfer tube 4 is a suitable filter 8. It will be observed that the vertical central axes of the two bowls 1 and 2 and of the tube 4 are substantially coincident.

It will be understood that in the operation of coffee makers of this character water is placed within the water heating bowl 1, while coffee grounds are placed within the infusion vessel 2 above the filter 8. When the water in the lower bowl 1 is heated, vapor pressure is created above the liquid level and eventually this pressure becomes so great that it forces the water through the transfer tube 4 into the infusion vessel 2 so as to steep the coffee grounds placed therein to make the coffee brew. When the heat is removed from the lower bowl, or is reduced sufficiently, the water vapor therein condenses and the vacuum thereby created becomes sufficiently great to cause the coffee brew in the upper bowl 2 to pass through the filter 8 into the lower bowl 1.

The two bowls 1 and 2 are supported by a stove or heater 9 arranged to apply heat to the bottom wall 7 of the water heating bowl 1. This stove comprises a helical resistance conductor 10 mounted in channels 11 provided for it in an insulating brick 12. This brick is supported in the pan-like housing 13. Also mounted on the heater brick, but in a bottom groove 14, is a temperature maintaining heating unit 15. The pan-like casing 13 is supported by a heat baffle 16 which in turn is supported by columns 16a mounted upon the bottom wall 17a of a pan-shaped base 17; this base is formed of a suitable electrically insulating material, such as a phenol condensation product.

All of the elements thus far referred to preferably will be and as shown are of substantially identically the same construction as are the corresponding elements shown in the drawing of the aforementioned Weeks patent.

Also, means are provided for controlling the heating elements 10 and 15 which means comprises a permanent magnet 18 mounted within the stove structure 9. The magnet as shown is of cylindrical form, and preferably it will be a permanent magnet of the sintered Alnico type. The cylindrical magnet is mounted to move vertically within a cylindrical casing 19 which is supported on and over a suitable supporting plate 20 fixed in the upper end of the base 17. As shown, the lower end of this cylinder is provided with a outwardly turned flange 21 which rests upon a disk-like member 22 which in turn is supported upon an inverted cup-shaped member 23, the member 23 being supported directly by the plate 20, preferably in a central depression thereof, as shown. Surrounding the cylindrical member 19 and spaced from it is a larger cylindrical member 24 which also is supported from the plate 20, as shown, and surrounding this cylindrical member 24 are two more progressively larger cylindrical members 25 and 26, the first extending upwardly from the baffle 16 and the second extending upwardly from the bottom wall of the pan 13. These various cylindrical members primarily function to baffle the magnet from the heat source of the stove. A cover plate 27 is provided for the inner cylindrical member 19 and is movable upwardly relatively to it. For this purpose, it is secured to an annular shaped member 28 mounted within the space between the cylinders 19 and 24, and which member is biased upwardly by a compression spring 29. This spring functions to bias the plate 27 firmly against the bottom surface of the bottom wall 7 of the lower bowl 1.

Depending from the lower end of the magnet 18 is a plunger 30 extending through apertures provided for it in the disk 22 and the cup-shaped support 23, as shown. This plunger functions to actuate a heat controlling switch 31 located in base 17, and is further utilized to force the magnet upwardly into an upper controlling position. For the purpose of moving the magnet upwardly against its weight there is provided a lever 32 within the base and pivotally mounted intermediate its ends to a support 33 extending downwardly from the plate 20. This lever is biased counter-clockwise, as viewed in Fig. 2, by means of a spring 34 so that its inner end bears against the bottom wall 17a of the base 17, the bottom wall functioning as a stop for the lever. When the lever is moved clockwise its inner end engages the bottom end of the plunger 30 and forces the magnet 18 upwardly against the cover plate 27. The lever is moved in this fashion by means of a plunger 36 connected to the outer end of the lever and having its end exposed whereby it may be engaged and pushed downwardly to actuate the lever.

When the magnet has thus been pushed upwardly, it permits the switch 31 to close to energize the stove from twin supply terminals 36a to apply heat to the lower bowl 1, as shown diagrammatically in Fig. 4. The switch 31, as shown, comprises a fixed contact 37 and a coacting movable contact 38; the contact 37 is mounted on a fixed switch arm 37a, while the contact 38 is mounted on a flexible switch arm 38a which biases the contact into contact with contact 37. These two arms are mounted on the plate 20, and are electrically insulated from each other and from the plate by insulating sheets 38b. The outer end of switch arm 38a projects beyond the contacts and is engageable by the plunger 30 for operation thereby; preferably and as shown the plunger will be provided with a head 38c larger than the plunger in diameter, and extending out to lie over the outer end of arm 38a.

The magnet 18 is held in its upper heat applying position wherein it permits the switch to remain closed to apply heat to the lower bowl by means of an armature 40 which is adapted to rest upon the inside bottom wall of the bowl 1 directly above the magnet. The armature is secured to the lower end of a pin 41 which in turn is directed through an aperture provided for it in a socket 42 which socket is arranged to clamp the lower end of the tube 4 as shown, and all as fully described in the aforementioned Weeks patent. Attached to the upper end of the pin 41 is an actuating disk 43. The magnet 18 in accordance with this invention is provided at its upper end with spaced-apart north and south poles, indicated N and S in the drawing, and which may be defined by providing a transverse slot 42a in the top portion of the magnet, as shown. When the magnet is in its upper position against the cover plate 27 and the armature 40 is in its lower position on the bottom wall 7 the armature will hold the magnet in its upper position by the magnetic attractive force interacting between them. The armature is made of pure nickel and it practically saturates magnetically when the magnet is brought upwardly to its position below it. However, when the armature 40 is elevated the magnet no longer can attract itself to the armature and it falls to its lower heat reducing position, as shown in Fig. 2, and opens the switch contacts 37 and 38. This shuts down the energization of the heater 10. The armature 40 is elevated by the rush of the water upwardly through the tube 4 which water engages the actuator 43 to elevate it when the rate of flow of the water attains a predetermined high velocity, all as described in the Weeks patent.

In order to effect a positive quick action of the control switch 31 to its open position and to hold it in that position the magnet 18 in accordance with this invention is provided at its lower ends with spaced-apart north and south poles, indicated N and S, and which may be defined by a transverse slot 43a. These lower north and south poles coact with the cup-shaped supporting member 23 which also functions as an armature and which preferably will be made of soft iron. That is, when the armature 40 is elevated to release the magnet and the magnet falls the north and south poles at the bottom of the magnet eventually come under the magnetic influence of the armature 23 and it is snapped to this armature with a predetermined force. This functions to positively and quickly open the switch contacts 37 and 38, and to insure that they are held open until again reclosed by the operation of the plunger 36. It will be understood that the cylindrical central portion of the magnet carries the flux for either the upper poles or for the lower poles. This permits the use of a relatively lightweight magnet and permits the use of the dual function magnet without a magnet assembly that weighs too much to be handled by the armature 40.

It will be understood that in the operation of the device the water is first placed in the lower bowl, and the grounds in the upper bowl, and then the plunger 36 is depressed which elevates the magnet 18 to its upper controlling position which permits the closure of the switch 31 whereby the unit 10 is energized from terminals 36a to apply heat to the lower bowl 1. As the water in the lower bowl is heated, it is forced upwardly into the upper bowl and eventually attains such a velocity in the transfer tube 4 that it acts on the disk 43 to elevate the armature 40 to dotted line position of Fig. 2. This releases the magnet 18 and permits it to fall to its lower position to which position the magnet is positively drawn by the interaction of its lower north and south poles and the fixed armature 23. This action positively opens the switch 31 to reduce the energization of the heater 10 to a point wherein the lower bowl 1 can cool to condense the vapor therein and cause the flow of the coffee brew to the lower bowl 1, and it positively holds the switch open.

Preferably and as described and claimed in the aforementioned Weeks patent when the switch 31 opens it will condition the heating elements 10 and 15 to function as warming units. As described in the Weeks patent, a thermostatic switch 44 is provided which opens when the stove is being heated up by the heater 10. However, after the water has been transferred to bowl 2 and the energization of the heater 10 cut down, the stove structure cools and as a result the thermostatic switch 44 closes at some low temperature of the stove. And when it closes, it connects the two heaters 10 and 15 in series to provide a low heat which will maintain the coffee brew in the vessel 1 heated. An indicator light 45 preferably will be connected in series in this circuit so as to indicate that the warming circuit is on.

While I have shown a particular embodiment of my invention, it will be understood, of course, that I do not wish to be limited thereto since many modifications may be made and I, therefore, contemplate by the appended claims to cover any such modifications as fall within the true spirit and scope of my invention.

What I claim as new and desire to secure by Letters Patent of the United States is:

1. In a vacuum type coffee maker having a water heating bowl, a coffee infusion bowl and a liquid transfer tube between the bowls, a heater for supporting and applying heat to said water heating bowl, a control device for said heater, a magnet and an armature controlling the operation of said control device, one of said magnet and armature constructed and arranged to rest on said bottom wall and the other of said members being located under said wall at a point opposite the one on said wall and operably associated with said control device to effect the operation thereof to cause said heater to apply heat to said water heating bowl when said other member is moved to one position into attractive relation with said one member and to apply said heat as long as said other member remains in said one position due to the magnetic attraction between said members, means biasing said other member to move from said one position to a second position to cause said control device to reduce the heat applied to said water heating bowl, an actuator connected to said one member constructed and arranged to move in said tube by the force of the fluid flowing therein so as to move said one member to separate said members when the rate of flow of said fluid attains a predetermined velocity, thereby to release said other member for movement toward said other position by said biasing means, and a second coacting magnet and armature, one in a stationary position, and the other attached to said other member for attracting it in to said other position as said other member is moved by said biasing means to a position where said second magnet and armature mutually attract each other.

2. A coffee maker comprising a water heating bowl, a coffee infusion bowl, a heater for applying heat to said water heating bowl, a liquid transfer tube connecting said bowls having its lower end terminating at a point above the bottom wall of said water heating bowl, an armature on said bottom wall, an actuator for said armature mounted in said tube and constructed and arranged to move upwardly in said tube responsively to the flow of water upwardly therein, a magnet under said bottom wall having at its upper end spaced-apart north and south poles which coact with said armature so that the magnet is held in an upper position by the attractive force between said armature and poles, and said magnet falling to a lower position when said armature is raised, said magnet further having at its lower end spaced-apart north and south poles, a fixed armature spaced below said magnet when it is in its upper position and coacting with said lower north and south poles as the magnet falls to attract it to itself with a predetermined force thereby to move the magnet to the lower position with a positive action, and a control element for said heater operated by said magnet as it moves into said lower position to reduce the heat applied to said water heating bowl.

EARLE C. SULLIVAN.

REFERENCES CITED

The following references are of record in the file of this patent:

UNITED STATES PATENTS

| Number | Name | Date |
| --- | --- | --- |
| 936,648 | Marshall | Oct. 12, 1909 |
| 2,004,114 | Hubbell | June 11, 1935 |
| 2,287,583 | Weeks | June 23, 1942 |
| 2,298,573 | Little | Oct. 13, 1942 |